FIG. I
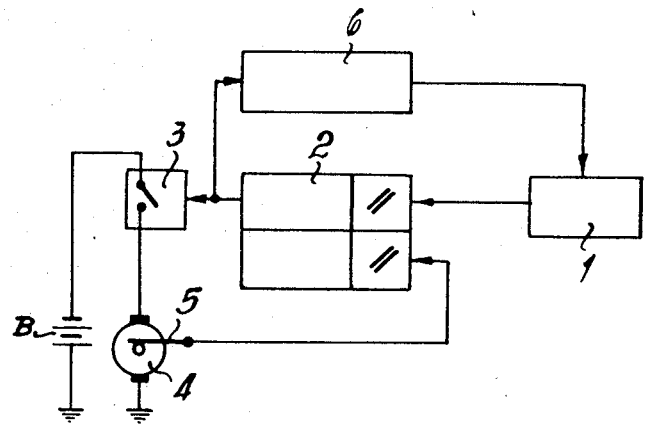
FIG. 5
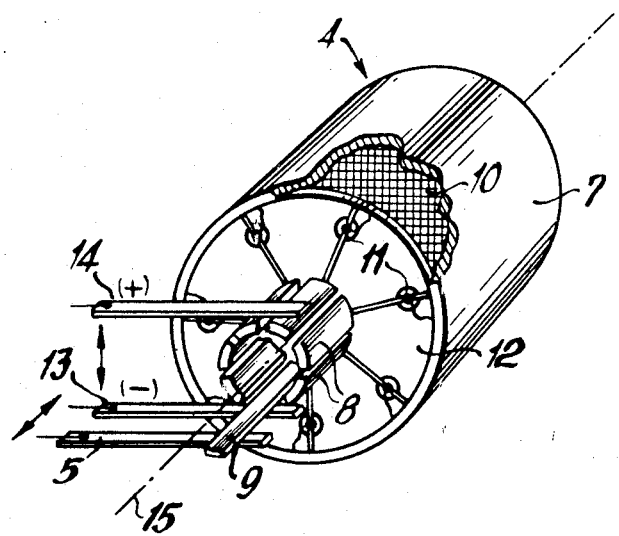

INVENTOR:
Walter Feulner
BY Singer, Stern & Carlberg
Attorneys.

FIG. 13
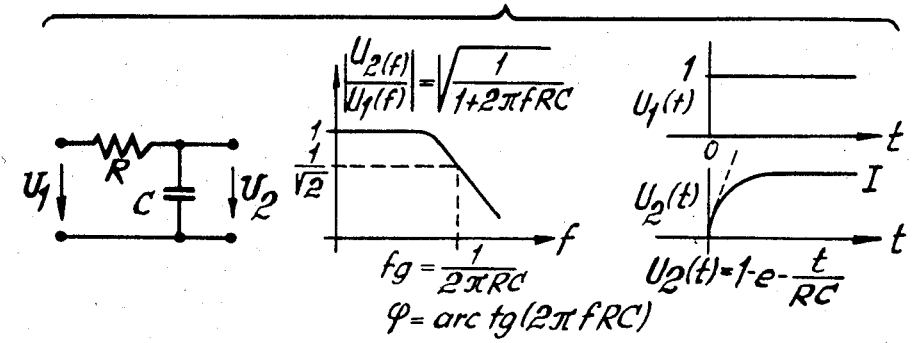
FIG. 14
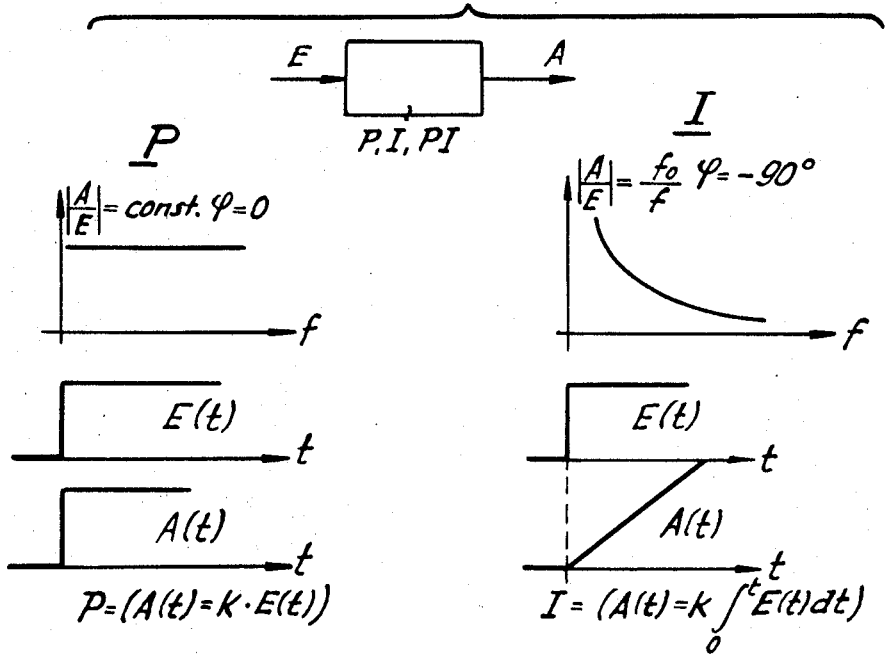
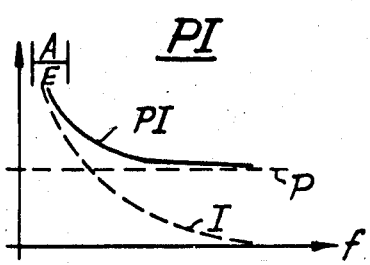
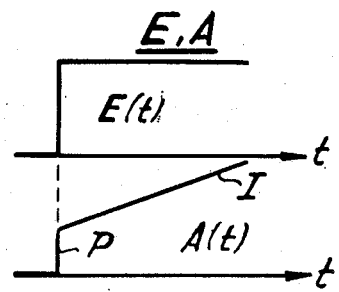

United States Patent Office 3,522,503
Patented Aug. 4, 1970

3,522,503
ELECTRONIC SPEED SYNCHRONIZING REGULATOR FOR DIRECT CURRENT MOTORS
Walter Feulner, Munich, Germany, assignor to Retobobina Handelsanstalt, Schaan, Liechtenstein, a corporation of Liechtenstein
Filed Aug. 20, 1968, Ser. No. 753,957
Claims priority, application Germany, Sept. 5, 1967, 1,588,654; Apr. 22, 1968, 1,763,220
Int. Cl. H02p 5/32, 5/34
U.S. Cl. 318—314                             6 Claims

ABSTRACT OF THE DISCLOSURE

The speed of a preferably small direct current motor is automatically controlled to be of a constant value by an electronic speed synchronizing regulator which employs an impulse generator for periodically operating a flip-flop circuit which by means of an electronic switch closes the motor circuit. A mechanical contact is connected with the flip-flop circuit and is adapted to be operated by at least one axially extended commutator bar of the motor armature to impart an impulse to the flip-flop circuit so that momentarily the flip-flop may open the motor circuit at least once during each revolution of the motor and thereby regulate the speed of the motor.

---

The invention relates to an arrangement for keeping the speed of an electric direct current motor provided with a commutator constant by phase comparison between the oscillation of an impulse generator and the angular position of the armature of the motor.

The invention applies particularly to small and miniature motors and preferably to miniature motors to be used in sound recording devices, such as tape recorders and dictaphones. The invention is, however, not limited to these apparatus.

Devices for the constant speed control of electric direct current motors are known. The disadvantages of such known devices will be briefly discussed in the following for the purpose of pointing out the distinctions between the prior art and the present invention.

In speed governors based on the centrifugal principle there are known to be used mechanical centrifugal brakes. The excess output of the motor is partially converted into frictional energy, so that the efficiency of the motor remains low. Added thereto are the mechanical wear of the centrifugal brake and possible speed changes during the life of the motor. Minor mechanical inaccuracies may already cause considerable short-term speed variations, i.e. so-called fluttering.

There are further known speed governors with electric centrifugal contact means in which a contact closed by the action of a spring rotates together with the armature and opens as soon as a certain speed is reached and interrupts the current supply to the motor until the speed has again sufficiently decreased. Since such governors operate according to the two-point method, a considerably amount of fluttering may occur. Also, taking out the centrifugal contact over slip rings is accompanied by difficulties and disadvantages which so far have not yet been overcome satisfactorily. A known proposal, for instance, provides for an inductive taking out of the centrifugal contact, but this requires more parts for the motor, namely three magnetically coupled coils, one of which rotates with the armature.

In speed governors provided with a tacho-generator a small direct current generator is included in the motor which produces a voltage proportional to the speed of the motor. By balancing this voltage, a control signal is obtained by means of which the motor current is controlled. While this arrangement may work satisfactorily and, in fact, is frequently made use of commercially, it causes considerably additional expense in the manufacture of the motor due to a second armature and a second commutator.

In governors having a bridge circuit, the motor is incorporated in the bridge circuit. One branch of the bradge contains the motor and a series resistance and the other branch is made up of two resistors. With a proper selection of the resistors, the diagonal of the bridge produces a voltage which is independent of the motor current and proportional to the speed. Thus, no separate tacho-generator is necessary. The disadvantages of this arrangement are the failure to make full use of the electromotive force of the armature of which only about 10% is available at a still usable degree of effectiveness of the motor circuit and the fact that transition tensions and resistances between brushes and commutator cause a considerably control error which, moreover, will change during life of the motor.

Speed governors with a tacho-generator and a bridge circuit include reference elements such as Zener diodes which show a substantial temperature response and, consequently, rather extensive means for compensating for this temperature response are necessary, particularly in a bridge circuit which produces only a small voltage. But a temperature compensation is successful mainly only for a limited temperature range. For these reasons, the mentioned two arrangements are usable only for battery potentials greater than 6 volts. Furthermore, speed governors of this type ars what may be called proportional action governors which with a suitable dimensioning of the circuit do indeed show little flutter, but they are afflicted with a speed error which is proportional to the load moment of the motor. This speed error can not be reduced at will be an increase in the control loop gain because this would adversely affect the stability of the governor.

A particular disadvantage of the aforementioned known electric direct current motors for a constant control of speed also is that the part of the battery voltage not used at a given time, drops at the transistor controlling the motor current which results in a not insigificant temperature increase in the transistor which must be carefully compensated for because otherwise the changed transistor data would affect deleteriously the desired specific speed of the motor.

The object of the present invention is to overcome the disadvantages of the prior art devices. The invention is principally not limited to any specific construction of an electric direct current motor, but it has proven to be particularly valuable in connection with miniature motors of the type disclosed in the U.S. Pat. No. 3,191,-081 and No. 3,308,319.

The invention will be described in the following by way of example with reference to the accompanying drawings in which:

FIG. 1 is a diagrammatic illustration of the synchronizating regulating arrangement of the invention;

FIG. 5 is a perspective view of a miniature direct current motor with a bell-shaped armature and a commutator;

FIGS. 13 and 14 illustrate other characteristics of modified embodiments.

Figure 2A:
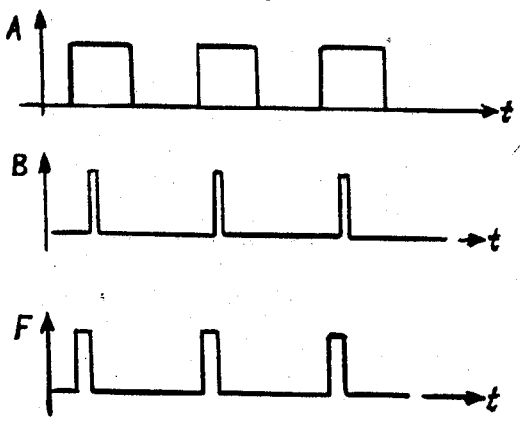
FIGS. 2a and 2b illustrate diagrammatically the operation of the arrangement.

Referring to FIG. 1, the principle of the speed synchronizing regulating arrangement for direct current motors, particularly small motors, is illustrated by an impulse generator 1 which periodically operates a bistable flip-flop circuit 2 which directly or by way of an electronic switch 3 causes the closing of the motor circuit, so that the motor 4 is energized. In a given angular position of the armature of the motor, a mechanical contact 5 attached to the motor 4 and operated by a commutator bar 9 (FIG. 5) imparts a return impulse to the bistable flip-flop circuit 2, so that the latter flips backward and thereby momentarily opens the motor circuit.

Figure 2B:
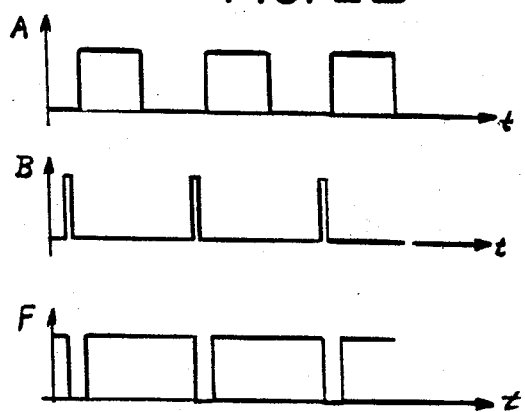

The operation of the arrangement is illustrated in the FIGS. 2a and 2b. The graph designated with A refers to the impulse generator 1 shown in FIG. 1. The graph designated with B indicates the contact pulse. The graph F represents the motor current pulses. At a low torque load of the motor 4 (FIG. 2a), the closed bistable flip-flop circuit 2 and therewith the closed motor circuit are opened again briefly after the negative going edge of the pulse generator due to the impulse of the contact 5, so that the mean armature current of the motor remains small in accordance with the small load. At an increased load (FIG. 2b) the angular position of the motor armature lags behind the phase angle of the generator impulse, so that the contact impulse occurs later and the bistable flip-flop circiut 2 is also opened later. This results in prolonged impulses of the motor current and a higher mean armature current which corresponds to the higher torque load.

In this manner, the motor 4 always runs in strict synchronism with the impulse generator 1 and the speed of the motor apart from minor reactions within the circuit, becomes practically completely independent of the torque load of the motor. The speed stability is equal to the frequency stability of the impulse generator.

The described phase comparison may be effected one or more times per revolution of the motor armature.

Another advantage of the arrangement according to the invention is the sparsity of mechanical parts required for the mechanical contact 5 (FIG. 1) which may, for instance, be in the form of a commutator segment which at every rotation of the motor armature brushes along a wire spring disposed perpendicularly to the motor armature. Also, the motor constants such as brush resistance, etc. have non influence on the speed. Furthermore, no voltage reference element is necessary which may cause the speed to respond to temperature changes. Since the motor potential is always completely connected or completely disconnected, only a very small and insignificant loss will occur in the performance of the transistor or electronic switch 3.

Due to the moment of inertia of the motor armature or of a gyrating mass coupled with it, regulating oscillations may occur in the arrangement of FIG. 1 in such manner that the width of the motor current impulses fluctuates about a mean value. This, however, may be avoided by a dampening feedback means (FIG. 1). At a change of magnitude of the motor current pulses, the feedback means 6 in the form of a differentiating or combined differentiating-integrating network delivers a voltage to the generator 1 which alters the oscillation frequency thereof in such manner, that the oscillation frequency is lowered with increasing duration of the motor current pulses and is increased with decreasing duration of the motor current pulses. Since the restoring means 6 has a differentiating effect, the oscillation frequency of the generator 1 will not be changed at a constant duration of the motor current pulses, but will be changed only by variations in the mean motor current. In actual practice the feedback means 6 may, for instance, consist of a simple resistor-capacitor network.

Sine generators with LC oscillation circuits require in the frequency range of the invention, for instance, 50 hertz at 3000 r.p.m., ferrite shells or head cores of large volumes in order to obtain a satisfactory frequency stability which renders their use in the regulating arrangement of the invention intended for small sound recording apparatus rather difficult.

In transistorized generators with RC phase shifting networks a sufficient frequency stability with respect to variations of the battery voltage and the ambient temperature can be obtained only with extensive stabilizing means, such as Zener diodes, temperature responsive resistors, etc., and frequently only within a limited temperature range.

Figure 3A:
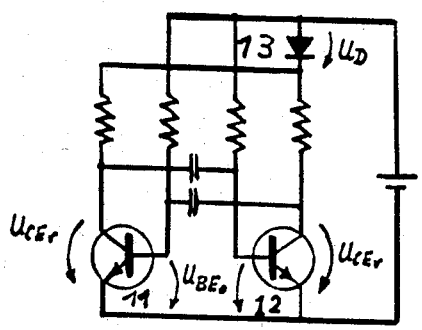
FIGS. 3a and 3b illustrate diagrammatically two designs of a multivibrator used in connection with the invention.
Figure 3B:
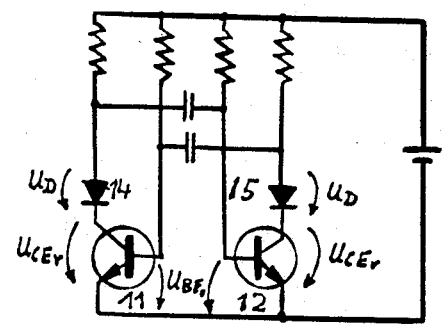

In the present case, there is used an astable multivibrator equipped with silicon transistors 11, 12, as shown in FIG. 3a or 3b, which by the insertion of a diode 13 in the common collector circuit or by inserting diodes 14, 15 each into the collector circuits of the transistors, are stablized as to temperature and battery voltage variations.

When the relation $U_D = U_{BE_0} - U_{CEr}$ is fulfilled, the oscillation frequency of the multivibrator becomes independent of the battery voltage. The terms of the above relation signify the following:

$U_D$ = forward voltage drop of the diode at a given collector current of the transistors.

$U_{BE_0}$ = base-emitter voltage of the transistors at the given bias point.

$U_{CEr}$ = collector-emitter saturation voltage of the transistors at the given collector current.

The collector-emitter saturation voltage $U_{CEr}$ shows only a very small temperature dependence. If now the temperature coefficient $dU_D/dT$ of the forward voltage drop of the diode is equal to the temperature coefficient $dU_{BE_0}/dT$ of the base emitter voltage of the transistors, and the collector-base leakage currents of the transistors are negligibly small, then the oscillation frequency of the generator becomes also independent of temperature. The remaining collector-base leakage currents may be neglected when silicon transistors are used. When the diodes 13, 14 and 15 are germanium point contact types, the above equation has been found to be readily solved.

A complete compensation is not possible in actual practice, but with the circuit according to the invention, a frequency stability is obtained which shows an improvement by a factor of 10 over a conventional transistorized multivibrator without the diodes 13, 14, 15.

The basic principle of the speed synchronizing regulating arrangement as diagrammatically illustrated in FIG. 1 permits of a large number of embodiments and modifications of the invention.

Figure 4:
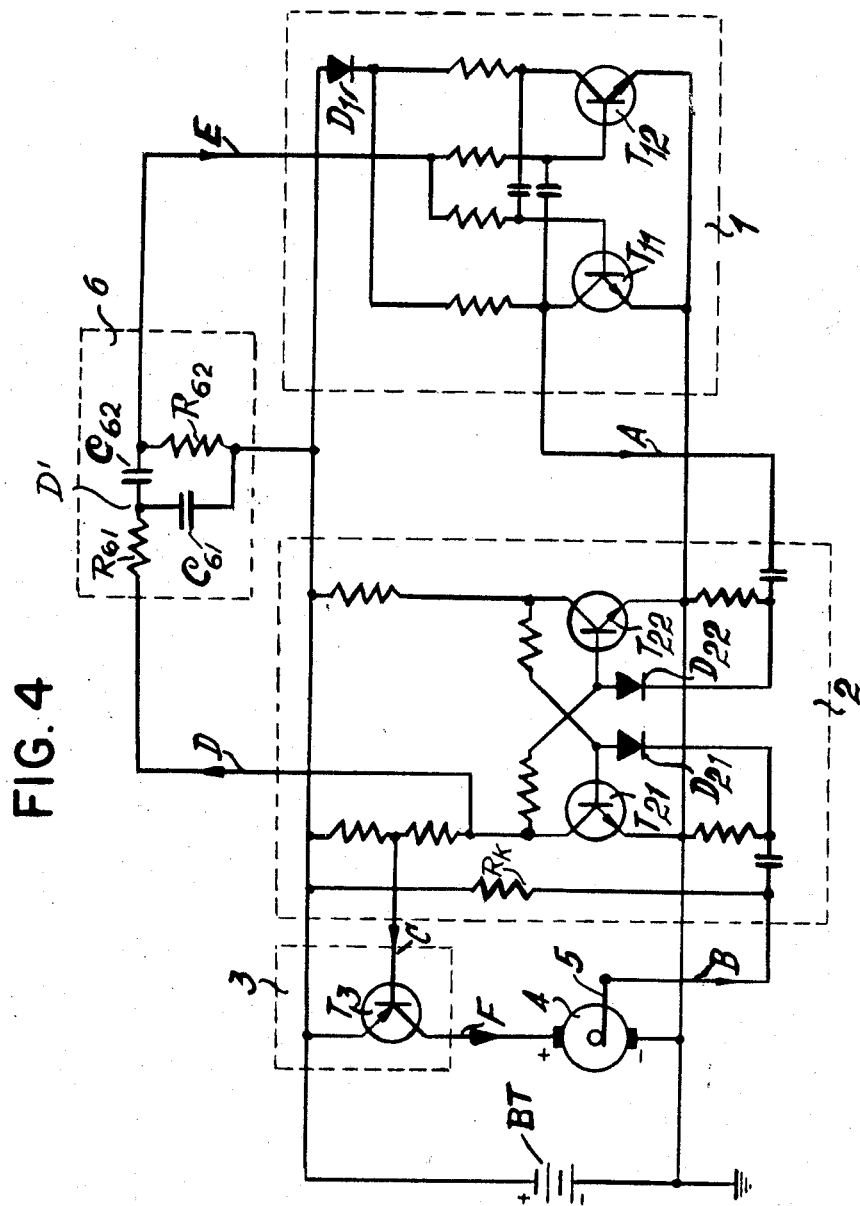
FIG. 4 illustrates digrammatically an embodiment of the invention.

One of these embodiments is diagrammatically illustrated in FIG. 4. In the same manner as in FIG. 1, an electron switch 3 is arranged between the bistable flip-flop circuit 2 and the motor 4. The impulse generator 1 is of the same type as shown in FIGS. 3a or 3b. In FIG. 4 the component parts 1, 2, 3 and 6 are illustrated by boxes indicated by dashed lines in order to show that they are the same components as illustrated in FIG. 1. The impulse generator 1 in FIG. 4 has incorporated therein an astable multivibrator equipped with silicon transistors $T_{11}$ and $T_{12}$ which are stabilized as to temperature and battery variations by the insertion of a diode $D_1$ into the common collector circuit of the transistors. The diode $D_1$ is preferably made of germanium.

The negative going edges of the generator impulses A through the diode $D_{22}$, render the transistor $T_{22}$ non-conductive. At the same time, the transistor $T_{21}$ becomes conductive and impairs a voltage C to the electronic switch 3. Thereby the transistor $T_3$ in the emitter configuration becomes conductive and the motor current F begins to flow.

The motor contact 5 is connected with the positive terminal of the battery B by the resistor $B_k$ in the flip-flop circuit 2. In one or more angular positions of the motor armature the contact 5 is closed by a commutator segment or segments of the motor commutator which segment or segments is or are simultaneously in contact with the minus brush of the motor. At this time, the potential of the contact 5 changes from plus to minus of the battery and a negative impulse is generated.

This particular operation is illustrated in FIG. 5. A miniature direct current motor 4 provided with a bell-shaped armature, and a commutator further includes the previously mentioned contact 5 and the minus brush 13 and the plus brush 14. With reference character 7 is designated the motor casing, the front portion of which is omitted for the purpose of making the commutator including the commutator segments 8 visible. In the illustrated embodiment, one of the commutator segments is provided with an axial extension 9. During each revolution of the motor armature 10, the segment extension 9 establishes an electrical connection between the contact spring 5 and the minus brush 13. It is also possible to have more than one commutator segment provided with an axial extension, so that during each revolution of the armature a number of connections is established which corresponds to the number of axially extending commutator segments. With reference character 11 are designated the connections of the armature winding 10 leading to the segments 8 of the commutator. They are disposed on or in a circular carrier disc 12 which is made of an insulating material and is fixedly attached to the winding 10. The carrier disc 12 is also securely fixed to the motor shaft 15 indicated by a dash-dotted line.

The negative contact impulse B (FIG. 4) renders the transistor $T_{21}$ non-conductive by way of the diode $D_{21}$. Therefore, the electronic switch 3 no longer receives a signal C; the transistor $T_3$ becomes non-conductive and the motor current F becomes zero.

In the FIGS. 2a and 2b, it was assumed for a better understanding of the functional principle of the speed regulating arrangement, that all impulses are positive. In an actual circuit such as shown in FIG. 4, however, the negative going edges of the generator impulses A and the contact impulses B have been used. The principle of the regulating device can be realized just as well with positive impulses, except that the circuitry would be a trifle more involved.

Figure 6A:
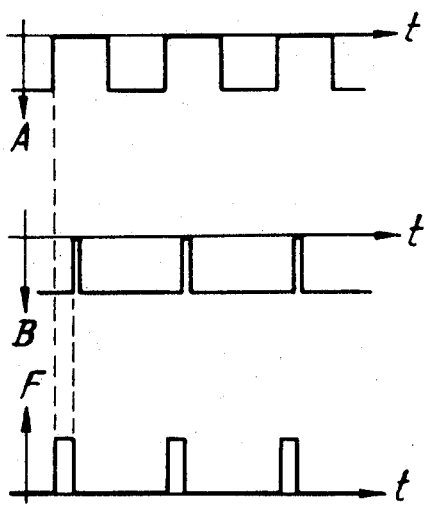
FIGS. 6a and 6b illustrate the operation of a modified arrangement.
Figure 6B:
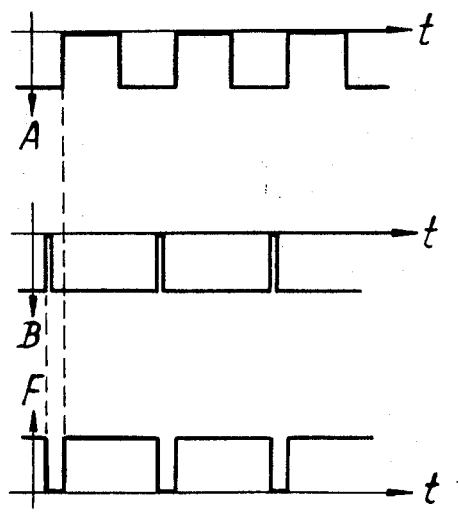

Consistent with the reference characteristics of FIG. 4 are those of the FIGS. 6a and 6b. The ordinates of these graphs signify the current impulses A, B and F with the arrows indicating the direction of the impulses, just as in the disclosure of FIGS. 2a and 2b. The abscissa $t$ represent the time. The circuit according to the FIGS. 6a and 6b, then produces the impulses A of the impulse generator 1. F are the motor current impulses between the electronic switch 3 and the motor 4. B are the contact impulses generated by the commutator by means of the contact 5. It will be noted that the current impulses A of the impulse generator 1 are of uniform magnitude throughout. The case of a low rotational momentum load of the motor 4 is illustrated in FIGS. 6a. Here, caused by the contact 5, the bistable flip-flop circuit 2 and with it the motor current F is again disconnected shortly after its connection; the mean armature current of the motor remains small. FIG. 6b illustrates the case of a higher load. The angular position of the motor armature with respect to the phase angle of the generator voltage lags behind, so that the restriction of the flip-flop circuit 2 takes at a later time, and a higher mean armature current is produced. FIGS. 6a and 6b also show that in the arrangement according to FIG. 4 the motor 4 always operates in strict synchronization with the impulse generator 1, just as in the arrangement according to FIGS. 2a and 2b. Thus the speed of the motor is practically independent of its torque load; the speed stability of the motor is equal to the frequency stability of the impulse generator.

In reality, of course, the current impulses do not rise completely vertically; the switching times of the transistors amount to only a few uses and may be neglected. The voltage of the motor is practically almost ideally rectangular. The motor current due to the inductance of the armature winding will however, rise and fall solely in accordance with an exponential function. The time constant of such a function is, however, substantially smaller, for instance 0.1 msec., than the duration of the motor current impulses which may amount to several msec. Since then the characteristic of the ascending motor current is irrelevant for the functioning of the circuit, it appears to be justified for the sake of a clearer representation to select a vertical rise.

In order to prevent misunderstandings, it may be pointed out that in FIGS. 6a and 6b, the generator impulses A are positive, but the impulse flanks are used in their negative direction. The contact impulses are negatively oriented even though the contact itself may always have a positive potential or a zero potential. The motor current impulses are always positive.

Figure 7:
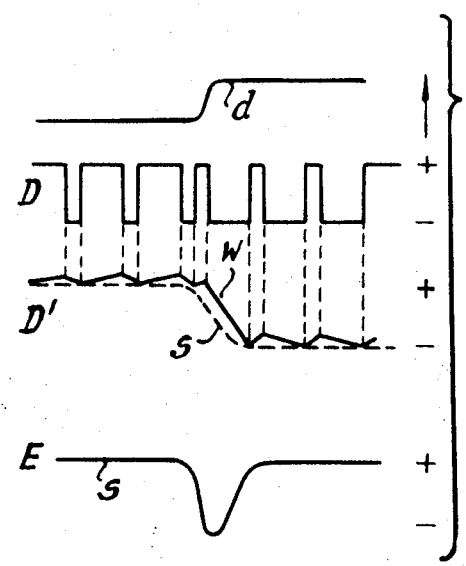
FIG. 7 illustrates diagrammatically the backlash behavior of the arrangement of the invention.

The feedback means 6 diagrammatically indicated in FIG. 4 smoothes by means of the resistor $R_{61}$ and the condenser $C_{61}$ the impulse voltage D generated in the bistable flip-flop circuit 2 at the collector of the transistor $T_{21}$. Reference is made to FIG. 7, where $d$ indicates the torque, $w$ the undulation and $s$ the mean voltage.

Due to the smoothing action of the restoring means 6, the voltage D' shows only a small undulation. The amplitude of the voltage D' is proportional to the mean connection period of the bistable flip-flop circuit 2 (signal D). The signal D' representing the mean voltage $s$ is differentiated by the differentiating network $C_{62}$–$R_{62}$ (FIG. 4), so that a signal E is produced. Changes in the mean conduction time of the bistable flip-flop circuit 2 thus produce a change in the voltage E across the base resistors $R_{11}$–$R_{12}$ of the transistors $T_{11}$ and $T_{12}$ in the impulse generator 1. Hereby the oscillation frquency of the impulse generator 1 is changed for short periods of time in such manner as already described in the foregoing with reference to a combined differentiating-integrating network.

For low quality requirements, the smoothening integrating capacitor $C_{61}$ may be omitted; the signal E still represents the differential of the direct current mean value of the impulses D generating at the collector of the transistor $T_{21}$. The signal E, however, has superimposed on it the impulse voltage D at a reduced amplitude (voltage divider $R_{61}$–$R_{62}$. This undulation of the voltage E has an additional undesirable effect on the impulse generator 1 which for high quality requirements can be avoided by the insertion of the capacitor $C_{61}$.

The electronic speed regulator illustrated in principle in FIG. 1 and in an embodiment by way of example in FIG. 4, may be further modified and improved as will be understood from the following description, also based on the principle of the present invention.

Figure 8:
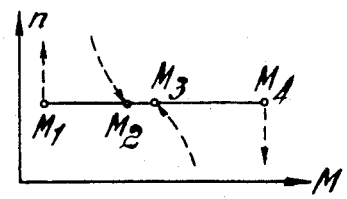
FIG. 8 illustrates the torque-speed characteristic.

The aforesaid arrangement exhibits a certain backlash behavior in the torque-speed curve according to FIG. 8.

With "backlash" will be designated here and in the following all those cases which involve functions of an electrical as well as a mechanical nature, that is, functions with different forward and return paths and consequently with different curves, which characterize the deviations between the forward and return movements, similar to those of the well known hysteresis loop in magnetism, but in special cases, the curves may also cross each other. In the present case only a mechanical hysteresis is taken into consideration, namely, the shape of the torque-speed curve. Depending on how the curve is being followed, one abacissa value is associated with two different ordinate values, or vice versa.

From the graph of FIG. 8, it will be noted that already at a small load $M_1$, for instance, in the order of the frictional momentum of the motor, the motor current impulses as shown in FIG. 6a, are so small that already minor load variations or small inaccuracies in the operation of the motor may result in a change of the phase angle between the contact impulse and the oscillation of the impulse generator, and this may lead to a disturbance of the synchronous operation of the motor. There occurs a surging between the motor speed and the frequency of the impulse generator, and the width of the motor current impulses changes periodically with this surge frequency. During a surge period, the relative connecting time of the motor current impulses, i.e. the ratio between the length or duration of the motor current impulses and the duration of one oscillation of the impulse generator, changes from 1 to 0. The mean value of the armature current of one surge period thus produced will be one-half of the amplitude of the peak armature current flowing during the motor current impulses. Thereafter, at a small load $M_1$, the motor runs hypersynchronously. Sychronism can again be attained solely at a higher load moment $M_2$ at which the mean armature current corresponds to the load moment because upon a load increase, the surge frequency changes abruptly until synchronism is again attained in $M_2$.

The arrangement according to FIGS. 1 and 4 shows a similar behavior at high load moments, as is illustrated in FIG. 8. If the load is increased above the possible maximum torque $M_4$ determined by the battery voltage, the motor constants and the speed, the speed by necessity must become subsynchronous. At $M_4$ namely the motor current impulses attain the relative maximum connecting time, and the motor current can under no circumstances be increased. If notwithstanding, the load is still increased, the motor speed will at first slightly fall off. Since, however, the phase relation and the synchronism are thereby immediately disturbed, a surging of the width of the motor current impulses occurs. During one surge period, the relative connecting time of the motor current impulses changes from 0 to 1, and the relative mean connecting time of the motor current impulses or the bistable flip-flop circuit 2 amounts to 0.5. Thus, the mean value of the generated armature current can only be one-half of the amplitude of the maximum armature current. Since, as known, a fixed relation exists between the speed (armature electromotive force), the armature current (torque) and the terminal voltage of the motor, it follows that the speed will decrease in accordance with the mean connection period of ½ brought about by the surging. If the torque load is again reduced, the surge frequency and the speed change several times step by step until at a momentum $M_3$, synchronism is reached again.

The moments $M_2$ and $M_3$ are such that they correspond to the mean value of the armature current generated during a surge period at an intended speed. The operation of the motor again becomes synchronous and the fixed phase relation between the impulse generator voltage and the contact impulses is reestablished.

The above discussion applies particularly to large gyrating masses. The acceleration time-constant of the motor armature plus the gyrating mass corresponds to more than 100 revolutions of the desired speed. For smaller gyrating masses, the backlash decreases due to the smaller acceleration constants; it is, however, brought about in the same manner as described above.

Figure 9:
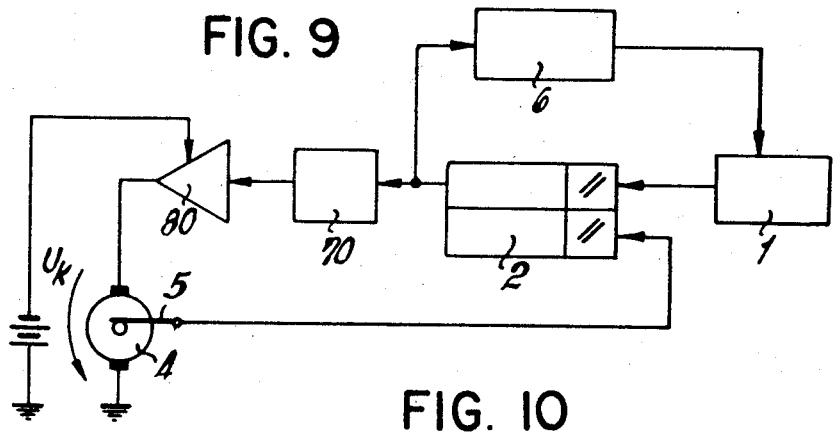
FIG. 9 illustrates diagrammatically a modified arrangement similar to FIG. 1.

According to the invention, this backlash condition may be considerably improved by an arrangement as shown in FIG. 9, in which in place of the electronic switch 3 (FIGS. 1 and 4) there is used a series arrangement of a delay means 70 and a voltage amplifier 80 having an amplification factor of 2.

The delay member 70 smooths the output impulses of the bistable flip-flop circuit 2, the amplitude of which is equal to that of the battery voltage so as to produce a direct voltage having but little undulation and whose amplitude is proportional to the battery voltage and the relative connection period of the bistable flip-flop circuit.

At a relative connection period of the bistable flip-flop circuit 2 of 0.5, the output of the delay member 70 has a voltage of one-half of that of the battery which at the output of the voltage amplifier having an applification factor of 2, produces a terminal voltage of the motor $U_k$ in the amount of the battery voltage.

At this terminal voltage, the motor can deliver its maximum $M_4$ (FIG. 8). If the load is further increased, the motor becomes subsynchronous; since, however, as already mentioned, a relative mean connecting time of the bistable flip-flop circuit 2 of 0.5 occurs, the input of the amplifier 80 continues to receive a smoothened voltage in the amount of one-half of the battery voltage, so that the motor is further supplied with the maximum terminal voltage in the amount of the battery voltage. When the load is reduced, the motor at the maximum torque $M_4$ may again return to synchronism.

Figure 10:
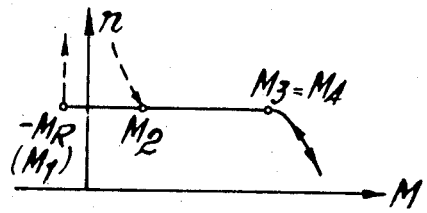
FIG. 10 illustrates a modified torque-speed characteristic.

The tortque-speed characteristic of the arrangement just described, is illustrated in FIG. 10.

This arrangement also improves the speed synchronizing regulation in connection with small load moments because even at a load moment of zero the electromotive force E of the armature necessary to maintain the speed of the motor must be available at the output of the amplifier 80, so that at its input a voltage of $E/2$ exists, from which follows a relative connection period of $E2U_{batt}$ ($U_{batt}$=battery voltage) of the bistable flip-flop circuit 2. Thus there remains a finite time difference or a phase angle $\varphi$ respectively, between the negative going ends of the impulse generator wave form and the contact impulses (FIG. 6a), and any disturbing influences would have to be of some magnitude to affect the synchronous operation. The relative connection period of the bistable flip-flop circuit becomes zero solely then when it is subjected to an exterior accelerating force which is greater than the frictional moment of the motor (FIG. 10 where $-M_R$ indicates generator operation).

This behavior according to FIG. 10, is particularly advantageous when the phase comparison between the contact impulse and the voltage of the impulse generator is effected several times per axial rotation of the motor and when in place of one contact, as shown in FIG. 9, a number of contacts are arranged on the circumference of the motor and, due to manufacturing tolerances, the angles between the individual contacts differ so that during one revolution of the motor the output impulses of the bistable flip-flop circuit are of varying length.

The arrangement according to FIG. 9 offers a further advantage in connection with small gyrating masses of the motor in that due to the largely smoothened terminal voltage supplied to the motor, no flutter will occur to any noticeable degree as may arise from the pulse-like armature current of the arrangement according to FIGS. 1 and 4.

If the bistable flip-flop circuit 2 is not operated at the full battery voltage, the amplification factor of the voltage amplifier 80 (FIG. 9) must be correspondingly increased, so that at a relative connection period of the bistable flip-flop circuit 2 of 0.5, all of the battery voltage is available at the output of the amplifier 80 for the terminal voltage of the motor. The delay means 70 may in its simplest form consist for instance of an RC low pass, the time constant of which is determined by the acceleration constant of the gyrating mass of the motor and by the permissible flutter of the motor speed. In order to increase the stability of the regulating arrangement, the condenser of the RC low pass may be connected in series with a resistor, whereby the delay means 70 approaches the character of a proportional integral network (PI).

The exact course of the torque-speed curve outside of synchronism is irrelevant for all practical purposes. At the upper torque limit, backlash is avoided by the modification of the circuit according to FIG. 9. As further previously mentioned, the lower tipping moment $M_1$ lies according to FIG. 10 at negative torque values. Also the exact course of the hypersynchronous speed curve is irrelevant in practice because the respective values are never below the point $M_1$.

The dashed lines in FIGS. 8 and 10 are merely a diagrammatic illustration of the backlash of the circuit according ot FIGS. 1 and 2 and of the modified circuit according to FIG. 9.

Figure 11:
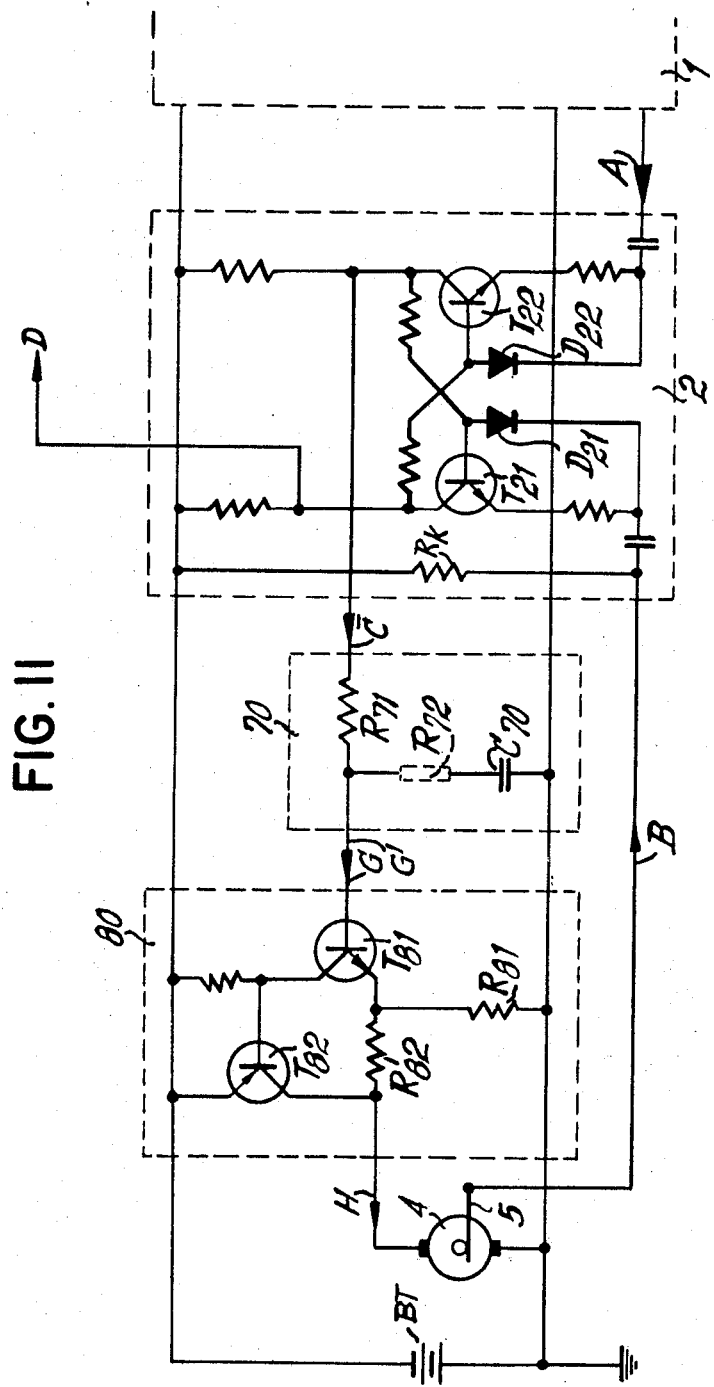
FIG. 11 illustrates diagrammatically still another arrangement, similar to FIG. 4.

FIG. 11 illustrates another modified circuit provided with circuit means 70 and 80. The impulse generator 1 is not again shown in detail but may assume to be that of FIGS. 4 or 3b.

Figure 12:
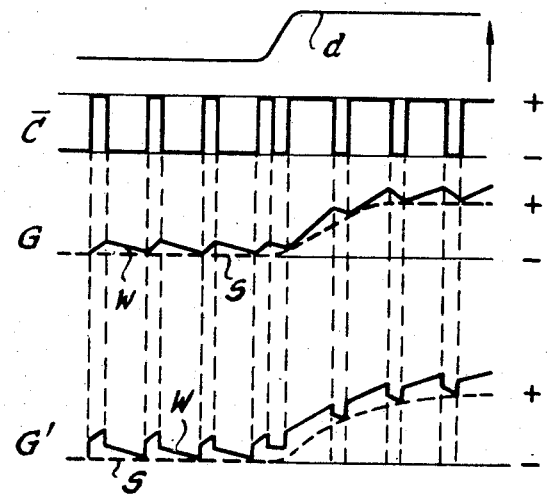
FIG. 12 illustrates the characteristic of the arrangement of FIG. 11.

As described with reference to FIG. 2, here again impulses A and B are delivered to the bistable flip-flop circuit 2. The pulse voltage is now taken opposite phase as $\overline{C}$ from the collector of the transistor $T_{22}$. The circuit means 70 consists in its simplest form of an RC low pass (integration member) $R_{71}-C_{70}(R_{72}=0)$. At the output of the member 70 is produced a smootened signal G (FIG. 12). The potential G has of but little undulation and in its amplitude corrseponds to the means on-time of the positive impulse $\overline{C}$ of the bistable flip-flop circuit 2. For increasing the stability of the regulation circuit, there may be added to the signal G—which is an integrated value of the signal $\overline{C}$—a quantity which is proportional to the signal $\overline{C}$ in that a resistor $R_{72}$ is connected in series with the integration capacitor $C_{70}$. In this case, a voltage G' is produced at the output of the circuit means 70.

The respective characteristic is shown in FIG. 12. As in FIG. 7, the torque is designated with $d$, the undulation The integrating means $R_{71}-C_{70}$ as already mentioned may consist of an RC low pass which according to the left hand portion of FIG. 13, comprises a resistor R and with $w$, and the mean potential with $s$.
a capacitor C. If the circuit is energized by an alternating current $U_1$ having a frequency $f$, then a voltage $U_2$ is produced at the output which decreases with decreasing frequency, as shown in the center portion of FIG. 13. The right hand portion of FIG. 13 shows how the circuit responds at its output to a unit voltage step $U_1$. For small time periods $t$ the starting voltage increases approximately linearly; in this range the circuit may therefore be regarded as an approximation of an inetgrator I and may be used as such.

In the formula found in FIG. 13 the phase angle between $U_1$ and $U_2$ is designated with $\varphi$. The PI designation is also here a short term for proportional-integral character common in electronics. The behavior of a pure P network and a pure I-member with respect to frequency and time is shown in FIG. 14. A PI-network combines the properties of the two component members; its frequency response and its reaction to a unit pulse at the inputs are also shown in FIG. 14 in which E designates the input signal and A designates the output signal. Since the terms P (Proportional) I (Integral) and PI (Proportional-Integral) are familiar concepts in control system engineering, a reference to FIG. 14 will provide the necessary understanding of the invention.

The voltage G or G', respectively, is according to FIG. 11 supplied to a direct current amplifier 80 which consists of the two transistors $T_{81}$ and $T_{82}$ and is internally coupled by way of the two resistors $R_{81}$ and $R_{82}$. Neglecting the emitter current of $T_{81}$, the resistors $R_{81}$ and $R_{82}$ have to be of equal magnitude in order that the output voltage H may have twice the amplitude of the input voltage G and G', respectively. Since, however, a collector and emitter current, respectively, must flow across $T_{81}$ for the purpose of energizing $T_{82}$ the feedback voltage of the emitter of $T_{81}$ is increased and in order to obtain a voltage gain of $H/G=2$, $R_{81}$ must be accordingly smaller. The exact dimensions depend on the motor constants (armature current) and the battery voltage.

What I claim is:

1. Arrangement for controlling the speed of an electric direct current motor having a rotatable armature with a commutator thereon, particularly for a miniature motor, including means forming a motor circuit, an impulse generator, a bistable flip-flop circuit for controlling the current flow in said motor circuit, an electronic switch, means for causing said impulse generator to operate said bistable flip-flop circuit by menas of said electronic switch which periodically closes said motor circuit at least once during each revolution of said motor, and a mechanical contact device on said motor for again opening said flip-flop circuit in at least one predetermined angular position of the armature of said motor, so as to momentarily open said motor circuit, wherein the improvement comprises a differentiating restoring means (6) for smoothening the controlling operation during variaitons of the closing time of the motor circuit, said restoring means changing the frequency of said impulse generator in such manner, that during the time the motor circuit closing impulses becomes longer, the frequency of said impulse generator is decreased, while said frequency is increased when said motor circuit closing impulses become shorter.

2. Arrangement according to claim 1, in which said impulse generator comprises an astable transistorized multivibrator having transistors, in each of the collector lines of which is inserted a diode, so that the frequency of said impulse generator is stabilized with reference to variations in the battery voltage energizing said arrangement and with reference to variations in the ambient temperature.

3. Arrangement according to claim 1, in which said impulse generator comprises an astable transistorized multivibrator having transistors provided with a common collector line, and a diode inserted in said common collector line, whereby the frequency of said impulse generator is stabilized with reference to variations in the battery voltage energizing said arrangement and with reference to variations in the ambient temperature.

4. Arrangement for maintaining constant the speed of an electric direct current motor, particularly of a miniature motor having a commutator including an impulse generator, a bistable flip-flop controlling the motor current, said impulse generator energizing said flip-flop at least once during one revolution of the rotary armature of said motor, a contact device on said motor for disconnecting said flip-flop circuit when said armature assumes a predetermined angular position, means for changing the frequency of said impulse generator during a change in the connecting time of the bistable flip-flop, said means comprising a differentiating return adjustment for dampening purposes, and a series circuit comprising a delay means (70) and a voltage amplifier (80) arranged between said bistable flip-flop and said motor, whereby the amplifying factor of said voltage amplifier is of such a value that during a relative connection period of said bistable flip-flop of .5, the entire available voltage is applied to the motor.

5. Arrangement according to claim 4, in which the impulses of said impulse generator have negative flanks which operates the bistable flip-flop (FIG. 2).

6. Arrangement according to claim 4, in which the means for return adjustment (6) effects a smoothening of the impulse voltage (D) appearing at the collector of the output transistor ($T_{21}$) of the bistable flip-flop, said means including a resistor ($R_{61}$) and a capacitor ($C_{61}$) thereby producing a voltage (D') with minor undulation ($w$), the height of which is proportional to the average duration of the connection of said bistable flip-flop, and a differentiating member ($C_{62}-R_{62}$) for differentiating said voltage to a signal (E) which is conducted to said impulse generator, so that during variations in the average connection time of said bistable flip-flop, a corresponding variation of the voltage (E) of the oscillation frequency of the impulse generator takes place briefly, said oscillation frequency voltage (E) appearing at the base resistors ($R_{11}$, $R_{12}$) of the transistors of said impulse generator (1).

References Cited

UNITED STATES PATENTS

| | | | |
|---|---|---|---|
| 3,008,075 | 11/1961 | Scott | 318—314 |
| 3,192,461 | 6/1965 | Hohne | 318—318 |
| 3,368,134 | 2/1968 | Mead et al. | 318—318 |
| 3,399,334 | 8/1968 | MacLeod | 318—329 |

ORIS L. RADER, Primary Examiner

R. C. CASARI, Assistant Examiner

U.S. Cl. X.R.

318—329